(12) United States Patent
Greenstein

(10) Patent No.: US 7,450,116 B2
(45) Date of Patent: Nov. 11, 2008

(54) DEVICE TO TRACK AND RECALL MULTIPLE VARIABLES

(75) Inventor: Marc Howard Greenstein, Cooper City, FL (US)

(73) Assignee: Flight Vitals, Inc., Cooper City, FL (US)

( * ) Notice: Subject to any disclaimer, the term of this patent is extended or adjusted under 35 U.S.C. 154(b) by 878 days.

(21) Appl. No.: 10/949,555

(22) Filed: Sep. 27, 2004

(65) Prior Publication Data
US 2005/0201212 A1 Sep. 15, 2005

Related U.S. Application Data

(60) Provisional application No. 60/551,489, filed on Mar. 9, 2004.

(51) Int. Cl.
*G09G 5/08* (2006.01)
(52) U.S. Cl. .............. 345/204; 345/156; 345/532; 345/543; 345/905; 345/973
(58) Field of Classification Search ................ 345/156, 345/204, 532, 543, 905, 973
See application file for complete search history.

(56) References Cited

U.S. PATENT DOCUMENTS

| | | | | |
|---|---|---|---|---|
| 4,001,814 | A * | 1/1977 | Morris et al. | 345/82 |
| 4,772,962 | A * | 9/1988 | Tanaka et al. | 386/69 |
| 5,130,853 | A * | 7/1992 | Sakurai | 359/803 |
| 5,877,742 | A * | 3/1999 | Klink | 345/685 |
| 6,449,497 | B1 * | 9/2002 | Kirbas et al. | 455/564 |
| 6,845,913 | B2 * | 1/2005 | Madding et al. | 235/462.13 |
| 2002/0122356 | A1 * | 9/2002 | Bourdeu | 368/327 |
| 2003/0076302 | A1 * | 4/2003 | Langstraat | 345/161 |
| 2004/0121821 | A1 * | 6/2004 | Hamasaki et al. | 455/572 |

OTHER PUBLICATIONS

Icarus Instruments—AltAlert 3070, website: http://www.icarusinstruments.com/AltAlertMain.htm., downloaded Oct. 25, 2004.
Airsport—IFR Altitude Alerter, website: http://www.airsport-corp.com/ifrinfo.html., downloaded Oct. 25, 2004.
Electronics International Inc.—Altitude Alert / Super Clock Intrument (ASC-5A), website: http://www.buy-ei.com., downloaded Oct. 25, 2004.
Shadin Co., Inc.—AMS-2000: Advanced Altitude Management and Alert System, website: www.shadin.com., downloaded Oct. 25, 2004.
Computer & Monitor, Maint., Inc.—Altitude Tracking module (ATM) website: http://www.cmm-atm.com/index1.htm., downloaded Oct. 25, 2004.
P2 Aviation Technology—Sky Buddy—Heading & Altitude Reminder, website: http://www.p2inc.com/skybuddy.asp., downloaded Oct. 25, 2004.

* cited by examiner

*Primary Examiner*—Bipin Shalwala
*Assistant Examiner*—Vince E Kovalick
(74) *Attorney, Agent, or Firm*—Sughrue Mion, PLLC

(57) ABSTRACT

An apparatus for storing, displaying and recalling data, includes a display field for displaying data, a memory for storing said data, a keypad for entering the data into the memory, and a field button associated with the display field for initiating entry of the data into the apparatus. The field button is adjacent to the display field. A recall button for recalling stored data and for causing the recalled stored data to appear on the display field is also provided adjacent to the display field.

14 Claims, 2 Drawing Sheets

DEVICE TO TRACK AND RECALL MULTIPLE VARIABLES

CROSS REFERENCE TO RELATED APPLICATIONS

This application is an application filed under 35 U.S.C. § 111(a) claiming benefit pursuant to 35 U.S.C. § 119(e)(1) of the filing date of the Provisional Application 60/551,489 filed on Mar. 9, 2004 pursuant to 35 U.S.C. § 111(b).

BACKGROUND OF THE INVENTION

The present invention is directed to a device capable of storing, tracking and recalling variables entered by a user. In particular, the device is applicable for pilot use during operation of an aircraft; however, the device has numerous other potential applications in situations where a user needs a device for storing and recalling multiple variables in a convenient format.

Often, multiple variables need to be accurately tracked as they change and easily recalled for later reference. A device specific to that need would be beneficial and convenient. Current methods utilizing written notes, electronic notes or computer software are too cumbersome.

For example, in aviation, a pilot needs to collect important flight data for later reference. The flight data may be written on paper or entered into a handheld electronic device designed for other use, such as general electronic notes found in conventional personal digital assistants (PDAs). Paper tends to be unwieldy, and if the flight data must be updated the pilot must continually take notes during flight. Devices such as PDAs are not designed for such data entry, and thus, are not organized in a user friendly format to store such information. Therefore, as with paper, the use of such devices tends to be unwieldy and inconvenient and could be a distraction for the pilot during use.

SUMMARY OF THE INVENTION

An apparatus consistent with the present invention provides easy storage, display and recall of multiple variables. Such an apparatus includes a user interface that uses simple and intuitive key strokes to enter and update the data. The apparatus includes displays which are easily viewed and logical in presentation.

Such an apparatus for storing, displaying and recalling data, includes a display field for displaying data; a memory for storing the data; a keypad for entering the data into the memory; a field button associated with the display field for initiating entry of the data into the apparatus, wherein the field button is adjacent to the display field; and a recall button for recalling stored data and for causing the recalled stored data to appear on the display field.

A method consistent with the present invention provides for easy data entry and recall of previously entered data in each specific display.

The method of storing, displaying and recalling data on a portable device, includes supplying power to the device; activating a first field button for initiating entry of a first data type into the device; and entering data of the first data type via a keypad into the device, wherein the data of the first data type is displayed on a first display field upon entry of the first data, wherein the data of the first data type is stored in a memory of the device, and wherein the first field button is disposed adjacent to the first display field.

Subsequent fields are similarly entered.

The present invention is adaptable to many uses and is not limited to a portable device for airplane pilots.

BRIEF DESCRIPTION OF THE DRAWINGS

The above and other features and advantages of the present invention will become more apparent by describing, in detail, exemplary embodiments thereof with reference to the attached drawings in which.

DETAILED DESCRIPTION OF EXEMPLARY EMBODIMENTS OF THE INVENTION

The present invention will now be described more fully with reference to the attached drawings, in which exemplary embodiments of the invention are shown.

There are various uses for the device described herein. Although the proposed usage described herein is a portable device for use by pilots, the invention is not limited to this use. The present invention is practical for any use in which multiple variables need to be accurately stored and easily recalled.

In the case of aviation, multiple variables need to be accurately stored and easily recalled for accurate and safe flying. It is critical that the device be simple to use, as the main mental focus for the pilot must always remain control of the craft.

The following description uses the above referenced aviation example to showcase the uniqueness of the device and its intuitiveness and simplicity of use.

Figure 1:
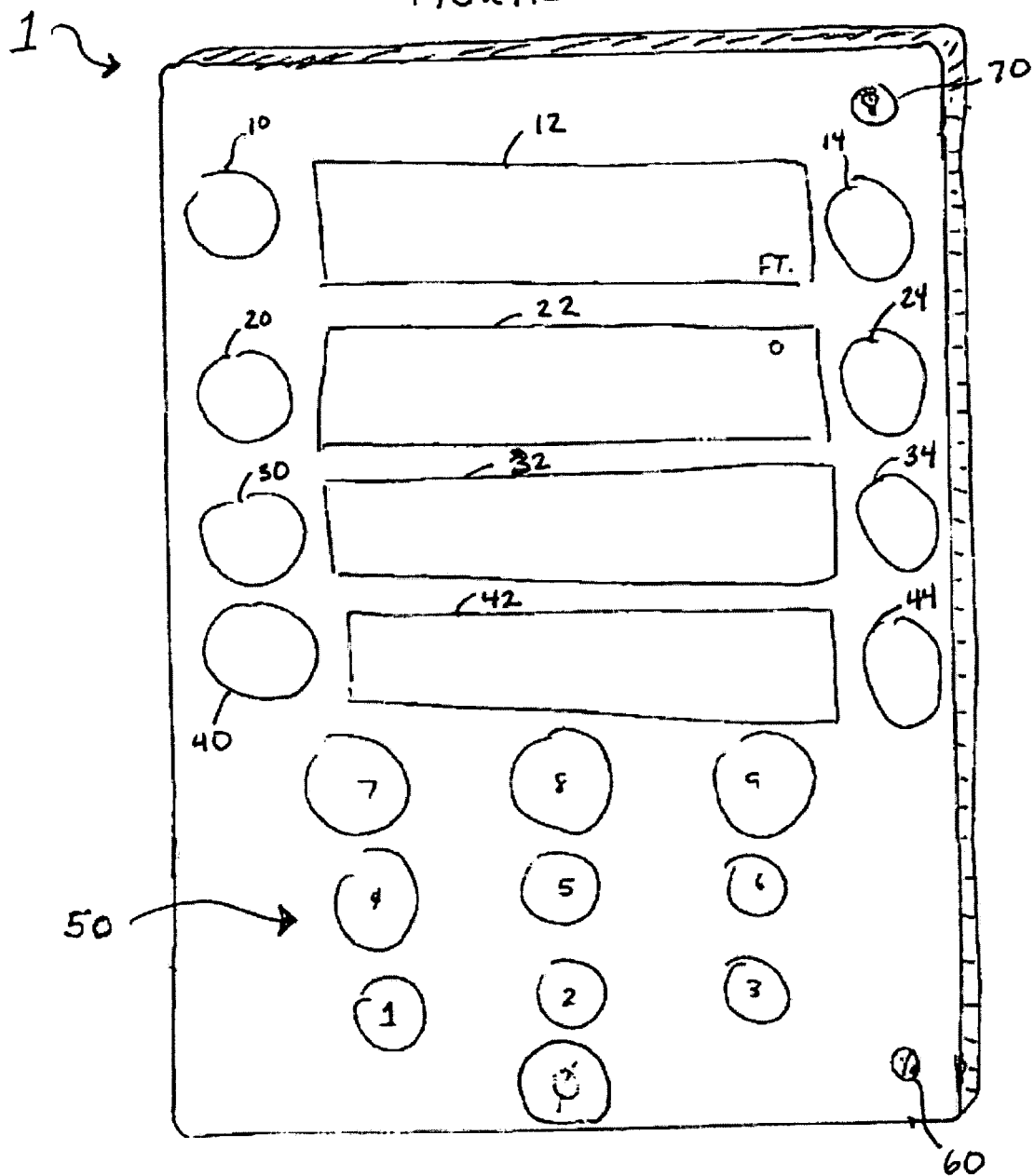
FIG. 1 is a front view of the device.

FIG. 1 illustrates an example of a general layout for a device 1 according to the present invention. The invention is not limited to the particular layout illustrated therein, and thus, the displays, keypad, etc., may be arranged differently depending on the particular use for the device 1.

In the example of FIG. 1, field buttons 10, 20, 30, 40 are provided adjacent to their respective display fields 12, 22, 32, 42. Recall buttons 14, 24, 34, 44 also are provided adjacent to the respective display fields 12, 22, 32, 42. A keypad, in this case a numeric keypad, is provided at 50, for entering data into the display fields. An on/off button 60 is provided for powering the device. A backlight button 70 is also provided for turning on the backlighting feature of the device 1.

Although the keypad is described as a numeric keypad in the exemplary embodiment, an alphanumeric keypad may also be used.

In the aviation use example described herein, the device 1 may store, track and recall four variables, i.e., navigational items, that are typically tracked by a pilot. These four navigational items include: altitude for flight; heading (magnetic) to maintain; frequency for on-going radio communication; and transponder setting (referred to herein as squawk code) to uniquely identify the craft on radar systems.

The device 1 shows each variable on a different display field 12, 22, 32, 42. The display fields may be liquid crystal displays (LCD), but the invention is not so limited. The user manually enters each variable into the device via the keypad 50. After the initial entry, those variables change (as instructed by radio broadcast from an air traffic controller to the pilot) throughout the flight and are referenced by the pilot on a recurrent basis.

With the present invention, each variable is easily changed when new information is received, as explained in further detail below.

Moreover, previously stored variables can be easily recalled by the user. This recall feature has many useful applications. For instance, if the pilot was unable to communicate on a newly designated frequency, recall of the last successful frequency would be critical to re-establish communication with air-traffic-control.

The device may operate on DC power from batteries or a DC power source available in the aircraft. A "low battery" indicator will warn of power failure before the displays go out.

For night flying, back-lighting of the displays and lighting of the user-interface buttons is accomplished by pressing the back-light display button 70. Activation of the back-light is set for a predetermined amount of time, e.g., four seconds, to allow enough time for the user to visualize the display fields 12, 22, 32, 42 without incurring too much battery drain.

An example of using the device in an aviation scenario will now be described wherein data is entered and updated.

Typically, a pilot initially speaks to a route planning specialist before departure and receives key navigational variables for initial navigation. In this example, the variables are altitude (5000 feet), heading (270 degrees), radio frequency assignment (119.7) and squawk code (0315).

The pilot places the device conveniently in the cockpit. Mounting options include a thigh strap, wrist strap, metal appendage to be held on a control yoke and other methods which would allow the device to be easily accessed and viewed during aviation.

The pilot first powers the unit on by pressing the power button 60.

Figure 2:
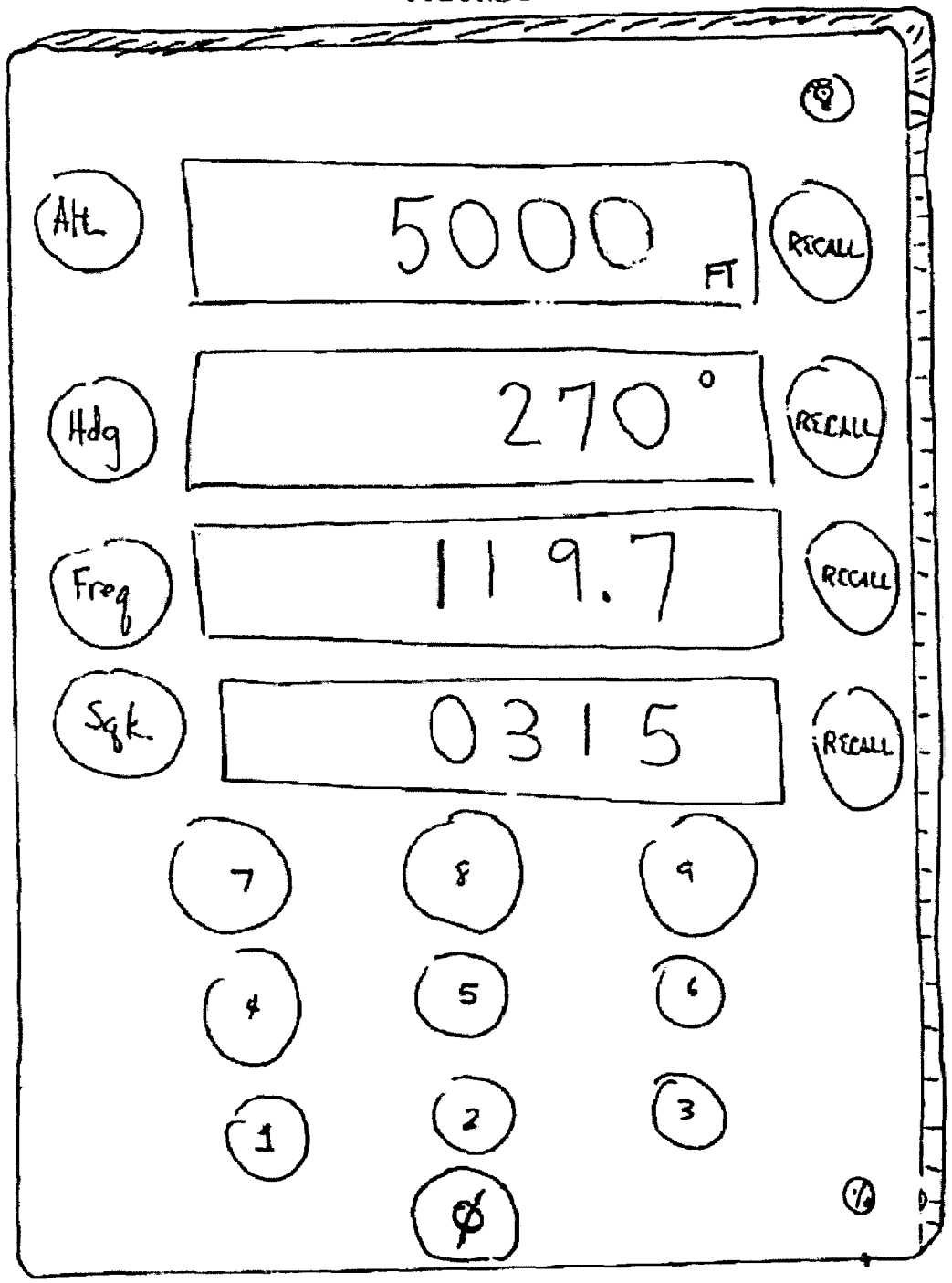
FIG. 2 is another front view adopting an example of particular data that may be stored and recalled in the device.

Upon receipt of the navigational variables from the route planning specialist, the pilot begins entering the variables into the unit. To enter the first variable, in this case altitude, the pilot presses field button 10, in this example labeled altitude or "alt" (see FIG. 2), to begin an entry for the altitude display field 12. Since the field button 10 for the altitude is directly adjacent to the display field 12 for the altitude, the use of this button to initiate entry of the altitude variable is intuitive to the user.

After pressing the field button 10 to initiate the entry of the altitude data, the pilot uses the numeric keypad 50 to enter the assigned altitude. Since altitudes are usually assigned in increments of 100, the one- and ten-digit placeholder may be permanently designated as 0, in order to save data entry steps. In other words, the pilot would only have to enter 5-0 to designate 5000 ft. This data is stored in a memory in the device 1.

After completion of this first data entry, the pilot then presses field button 20 to initiate entry of the heading data. In this example, the heading field button 20 is labeled "hdg". For this example, the heading entry is 2-7-0. As with the altitude entry, the heading is entered via the keypad 50.

The remaining variables are entered into the device by pressing the field button 30, labeled "freq" for frequency in this case, and entering the frequency of 1-1-9-7 (the decimal point to automatically appear after the first three digits are entered and any trailing zeros are automatically entered). Field button 40 is pressed to initiate entry of the squawk code, which is also entered via the keypad 50 by pressing the 0-3-1-5.

In this example, after departure the pilot receives direction to climb to 7500 feet. To enter this revised altitude into the device 1, the pilot presses field button 10 which clears the display field 12 for the altitude. Then, 7-5 is entered via the keypad 50 and the display field 12 shows 7500 feet accordingly. Thus, the original altitude of 5000 ft. is stored (although not shown) in the memory of the device along with the updated altitude of 7500 ft shown in the display.

If the co-pilot were to inquire as to the altitude from which they are climbing, the device can easily recall the previous information (i.e., 5000 ft.) which is stored in the memory. Specifically, the pilot taps the recall button 14 associated with the altitude display field 12 and 5000 (the prior entry for the altitude variable) is displayed momentarily. The display field 12 then returns to the current assigned altitude of 7500. If the pilot wishes to recall a series of past altitude entries which had been entered into the device, the pilot repeatedly taps the recall button 14.

For example, a series of three pieces of data may be entered into the device for the altitude (first data type). An initial data (5000 ft.) is entered, followed later by the entry of an updated data (7500 ft.), and an additional updated data (9000 ft.). To recall any of the initial data, updated data, or additional updated data, the user simply presses the recall button one, two or three times, to view the altitude data (9000, 7500, 5000 ft., respectively).

Thus, with the present invention, the user is able to store a series of data for each type of data in the device, and easily recall any of these pieces of data as needed.

To clear the memory of all entries for a given variable, the corresponding recall button for that variable is held down for 3 seconds (e.g., the user presses and holds recall button 14 to clear all altitude headings).

To turn off the unit, power button 60 is pressed and held down for 3 seconds. The power button 60 is dually back-lit. Under usual circumstances, it is a light color identical to the backlighting on the rest of the unit. When the device detects a low power level, the backlight for the power button 60 changes to flashing red to notify the user.

In addition to the foregoing fields, the device may also include a timer. Displaying a timer in an additional display field has numerous uses during aviation.

In addition, the keypad 50 may be an alphanumeric keypad. Although the navigational variables provided in the above example do not require alpha designation, other fields are contemplated which would use such designation. For example, a pilot is sometimes given instructions to fly to a particular location, i.e., an aviation intersection such as WINCO or to a navigation aid such as PHK, a Florida navigation transmitter.

Still further, the present invention may be directed to a portable device, or a device that is permanently mounted to the aircraft. With respect to a portable device, recreational and professional pilots don't always fly the same aircraft, and thus, the pilot would need to easily carry and mount their portable device. On the other hand, for those pilots that continually fly the same equipment, it would be more convenient to permanently mount the device to the aircraft. In either case, the device has a fairly portable size and shape for either use.

The above example is directed to instrument flight rule (IFR) conditions. However, the device is also applicable to visual flight rule (VFR) conditions to track navigation from a prepared flight plan.

Although the above exemplary embodiment is directed to a device in which the pilot manually enters and updates the applicable data, the device may also receive and enter the data automatically without requiring specific input from the pilot. With such a device, the pilot would still be able to recall data as necessary.

With the present invention, multiple variables may be entered into a hand-held sized device. Since each field button is adjacent to its respective display field, the layout of the device makes use of the device intuitive to the user, so that a user may easily operate the device without requiring any advance instruction. Moreover, since the device is particularly suited for the data entry for which it has been designed, the use of the device is easy and convenient.

Although the above examples specify an aviation scenario, the device of the present invention can be applied to many other purposes. By designing the various display fields to correspond to data required for a particular purpose, the present invention functions as a useful tool in an environment where multiple fields of data need to be easily saved and retrieved in an intuitive format.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for storing, displaying and recalling data, comprising:
    a display field for displaying data;
    a memory for storing said data;
    a keypad for entering said data into said memory;
    a field button associated with said display field for initiating entry of said data into said apparatus, wherein said field button is adjacent to said display field; and
    a recall button for recalling stored data and for causing said recalled stored data to appear on said display field,
    wherein said apparatus comprises four display fields for displaying four different types of data, respectively, and wherein four recall buttons are provided for each of said four display fields, respectively, and wherein four field buttons are provided for each of said four display fields respectively.

2. The apparatus according to claim 1, wherein said four display fields display altitude, magnetic heading, radio frequency and transponder code, respectively.

3. The apparatus according to claim 1, further comprising an on/off backlight switch for switching backlighting on/off said display and/or said numeric keypad.

4. The apparatus according to claim 1, further comprising an on/off switch for activating said apparatus.

5. The apparatus according to claim 1, further comprising a power source.

6. The apparatus according to claim 1, further comprising a portable mounting device for removably mounting said apparatus.

7. A method of storing, displaying and recalling data on a portable device, comprising:
    supplying power to the device;
    activating a first field button for initiating entry of a first data type into the device;
    entering initial data of said first data type via a keypad into the device, wherein said initial data of said first data type is displayed on a first display field upon entry of said initial data, wherein said initial data of said first data type is stored in a memory of the device, and wherein said first field button is disposed adjacent to said first display field; and
    activating a first recall button for causing said initial data of said first data type stored in said memory to be displayed on said first display, wherein said first recall button is disposed adjacent to said first display field.

8. A method of storing, displaying and recalling data on a portable device comprising:
    supplying power to the device;
    activating a first field button for initiating entry of a first data type into the device;
    entering initial data of said first data type via a keypad into the device, wherein said initial data of said first data type is displayed on a first display field upon entry of said initial data, wherein said initial data of said first data type is stored in a memory of the device, and wherein said first field button is disposed adjacent to said first display field;
    activating a second field button for initiating entry of a second data type into the device; and
    entering initial data of said second data type via a keypad into the device, wherein said initial data of said second data type is displayed on a second display field upon entry of said second data type, wherein said initial data of said second data type is stored in said memory of the device, and wherein said second field button is disposed adjacent to said second display field.

9. The method of storing, displaying and recalling data on a portable device according to claim 8, further comprising:
    activating a second recall button for causing said initial data of said second data type stored in said memory to be displayed on said second display field, wherein said second recall button is disposed adjacent to said second display field.

10. A method of storing, displaying and recalling data on a portable device comprising:
    supplying power to the device;
    activating a first field button for initiating entry of a first data type into the device;
    entering initial data of said first data type via a keypad into the device, wherein said initial data of said first data type is displayed on a first display field upon entry of said initial data, wherein said initial data of said first data type is stored in a memory of the device, and wherein said first field button is disposed adjacent to said first display field;
    activating said first field button for initiating a new entry of said first data type into the device; and
    entering updated data of said first data type via a keypad into the device, wherein said updated data of said first data type is displayed on said first display field upon entry of said updated data, wherein said updated data of said first data type is stored in said memory of the device, and wherein said first field button is disposed adjacent to said first display field.

11. The method of storing, displaying and recalling data on a portable device according to claim 10, further comprising:
    activating a first recall button for causing said updated data of said first data type stored in said memory to be displayed on said first display field, activating said first recall button again for causing said initial data of said first data type stored in said memory to be displayed on said first display field.

12. The method of storing, displaying and recalling data on a portable device according to claim 10, further comprising:
    activating said first field button for initiating a new entry of said first data type into the device; and
    entering additional updated data of said first data type via a keypad into the device, wherein said additional updated data of said first data type is displayed on said first display field upon entry of said updated data, wherein said additional updated data of said first data type is stored in said memory of the device, and wherein said first field button is disposed adjacent to said first display field.

13. The method of storing, displaying and recalling data on a portable device according to claim 12, further comprising:

activating a first recall button for causing said additional updated data of said first data type stored in said memory to be displayed on said first display field, activating said first recall button again for causing said updated data of said first data type stored in said memory to be displayed on said first display field, and activating said first recall button again for causing said initial data of said first data type stored in said memory to be displayed on said first display field.

14. A method of storing, displaying and recalling data on a portable device, comprising:

supplying power to the device;

activating a first field button for initiating entry of a first data type into the device; and entering initial data of said first data type via a keypad into the device, wherein sad initial data of said first data type is displayed on a first display field upon entry of said initial data, said initial data of said first data type is stored in a memory of the device, and wherein said first field button is disposed adjacent to said first display field, wherein said device includes four display fields for displaying four different types of data, four field buttons disposed adjacent to said four display fields, respectively, and four recall buttons disposed adjacent to said four display fields, respectively.

* * * * *